May 12, 1970  D. F. HELM  3,511,969
COATED ARC WELDING ELECTRODE FOR MINIMIZING POROSITY OR FOR
MINIMIZING BOTH POROSITY AND VARIATION IN COMPOSITION OF
THE WELD METAL AT THE START OF WELDING
Filed Oct. 3, 1968

DAVID F. HELM
INVENTOR
BY
Edward Hoopes III

HIS ATTORNEY

United States Patent Office
3,511,969
Patented May 12, 1970

3,511,969
COATED ARC WELDING ELECTRODE FOR MINIMIZING POROSITY OR FOR MINIMIZING BOTH POROSITY AND VARIATION IN COMPOSITION OF THE WELD METAL AT THE START OF WELDING
David F. Helm, Mount Lebanon, Pa., assignor to The McKay Company, Pittsburgh, Pa., a corporation of Pennsylvania
Filed Oct. 3, 1968, Ser. No. 764,688
Int. Cl. B23k 35/22
U.S. Cl. 219—146    10 Claims

ABSTRACT OF THE DISCLOSURE

A coated arc welding electrode for minimizing porosity or for minimizing both porosity and variation in composition of the weld metal at the start of welding comprising a core wire having a coating thereabout, the core wire having a body of uniform cross-sectional area and a starting end portion at one end of the body, the starting end portion of the core wire having at the end of the electrode a length of substantially the same cross-sectional area as the body of the core wire and including a length of diminished cross-sectional area following the first mentioned length, the cross-sectional area of the length of diminished cross-sectional area of the core wire being between about thirty-five and about eighty-five percent of the cross-sectional area of the body of the core wire, the total cross-sectional area of the electrode, including the coating, at the length of diminished cross-sectional area of the core wire being between about thirty-five and about one hundred percent of the total cross-sectional area of the electrode, including the coating, at the body of the core wire. The coating preferably is a stainless-low hydrogen type coating. The components of the electrode are preferably proportioned so that the ratio of the quantity of coating consumed to the quantity of core wire consumed during the melting of the starting end portion is between about ninety and about one hundred twenty percent of the ratio of the quantity of coating consumed to the quantity of core wire consumed during the melting of the body of the electrode. The length of the starting end portion of the core wire which is of substantially the same cross-sectional area as the body of the core wire preferably has a longitudinal extent equal to between about .1 inch and about .4 inch and the length of the starting end portion of the core wire which is of diminished cross-sectional area has a longitudinal extent equal to between about .2 inch and about 1 inch. The length of the starting end portion of the core wire which is of diminished cross-sectional area preferably has a longitudinal extent equal to between about .3 inch and about .7 inch.

Figure 1:
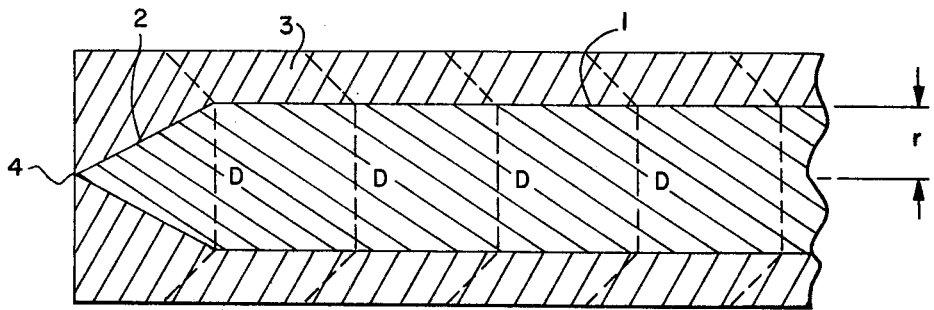

The total cross-sectional area of the electrode, including the coating, at the length of diminished cross-sectional area of the core wire may be substantially the same as the total cross-sectional area of the electrode, including the coating, at the body of the core wire.

This invention relates to a coated arc welding electrode for minimizing porosity or for minimizing both porosity and variation in composition of the weld metal at the start of welding. Such electrodes may be employed in shielded metal-arc welding.

The invention is especially applicable, although not limited, to electrodes used to deposit stainless steel alloys, nickel base alloys and mild and alloy steels, particularly those with relatively high stretngth levels. While the principles of the invention may be carried out with any coating, because they are now almost exclusively used for obtaining these highest quality weld deposits the electrodes coatings usually employed are of the type known variously as carbonate-fluoride, basic or stainless-low hydrogen coatings. They produce high quality metal by means of good slag protection and carefully selected deoxidation metal and alloy additions and form the deposit metal under a protective gas shield which originates as carbon dioxide produced by the thermal decomposition of metallic carbonates in the coating such as limestone.

Coatings of the type above referred to which employ fluorides as fluxing agents for the carbonate residues have long been used, especially for highly alloyed deposits such as the stainless steels. When made without hydrogen containing materials and high baked for very good drying they have also in recent years come to be known as low hydrogen coatings and have been especially suitable for low alloy and unalloyed ferritic steel analyses as well. Many of these are metals of which the maximum perfection is desired. It is not unusual to find electrode deposits which are entirely satisfactory except for starting porosity or unreliable analyses occurring only in the very first portion of the bead. I have solved the problem and provided an electrode which minimizes both proosity and variation in composition of the weld metal at the start of welding.

Sensitivity to starting porosity in general is a function of many factors among which are:

(1) Electrical conditions of welding, especially current density on the electrode core wire
(2) Temperature gradient in the base metal under the weld pool
(3) Base metal plate thickness
(4) Manipulation techniques employed by the weldor
(5) Moisture content of the electrode
(6) Coating ingredients, especially deoxidation metals
(7) Volume of shielding gas and slag per units of weld metal
(8) Coating to core wire volume ratio All of these factors work together to produce a balance and compared with the later portions of the electrode some of the factors in this balance are distorted as the starting portion of the electrode is consumed.

The conventional manual coated electrode has a straight uniform core wire of constant diameter and a straight uniform coating of constant thickness except where stripped away for gripping by the holder and where ground away or "brushed back" at the striking end at an angle typically about twenty to forty-five degrees to facilitate easy striking of the arc. The removal of this small amount of coating is demanded by the weldor for his convenience and, in combination with the fact that the coating burns or melts off at an acute angle to the core wire to form a "cup" around the arc, results in less coating being consumed or melted per increment of length of core wire at the starting end portion than for the balance of the electrode. Because of this low coating-to-core wire melting ratio the weld metal initially deposited is under supplied with those contributions which the coating is designed to make. Since the coating shields the arc and weld metal from porosity inducting contamination this coating deficiency tends to raise the porosity of the weld metal at the start of the weld. It is especially important that, compared with later weld metal which freezes slowly from a hot weld pool lying on a preheated plate, starting weld metal tends to trap porosity by freezing too rapidly from a cool weld pool losing heat to a cold plate. To rapidly raise the starting weld pool to a good working temperature requires that extra electrical energy per unit of weld metal be supplied at the start of the weld. Such increased energy is best secured through a current density increase which is most readily effected by reducing the electrode cross-section.

I provide a coated arc welding electrode for minimizing porosity or for minimizing both porosity and variation in composition of the weld metal at the start of welding comprising a core wire having a coating thereabout, the core wire having a body of uniform cross-sectional area and a starting end portion at one end of the body, the starting end portion of the core wire having at the end of the electrode a length of substantially the same cross-sectional area as the body of the core wire and including a length of diminished cross-sectional area following the first mentioned length, the cross-sectional area of the length of diminished cross-sectional area of the core wire being between about thirty-five and about eighty-five percent of the cross-sectional area of the body of the core wire, the total cross-sectional area of the electrode, including the coating, at the length of the diminished cross-sectional area of the core wire being between about thirty-five and about one hundred percent of the total cross-sectional area of the electrode, including the coating, at the body of the core wire. The coating preferably is a stainless-low hydrogen type coating. The components of the electrode are preferably proportioned so that the ratio of the quantity of coating consumed to the quantity of core wire consumed during the melting of the starting end portion is between about ninety and about one hundred twenty percent of the ratio of the quantity of coating consumed to the quantity of core wire consumed during the melting of the body of the electrode. The length of the starting end portion of the core wire which is of substantially the same cross-sectional area as the body of the core wire preferably has a longitudinal extent equal to between about .1 inch and about .4 inch and the length of the starting end portion of the core wire which is of diminished cross-sectional area has a longitudinal extent equal to between about .2 inch and about 1 inch. The length of the starting end portion of the core wire which is of diminished cross-sectional area preferably has a longitudinal extent equal to between about .3 inch and about .7 inch.

The total cross-sectional area of the electrode, including the coating, at the length of diminished cross-sectional area of the core wire may be substantially the same as the total cross-sectional area of the electrode, including the coating, at the body of the core wire.

Other details, objects and advantages of the invention will become apparent as the following description of certain present preferred embodiments thereof proceeds.

Figure 2:
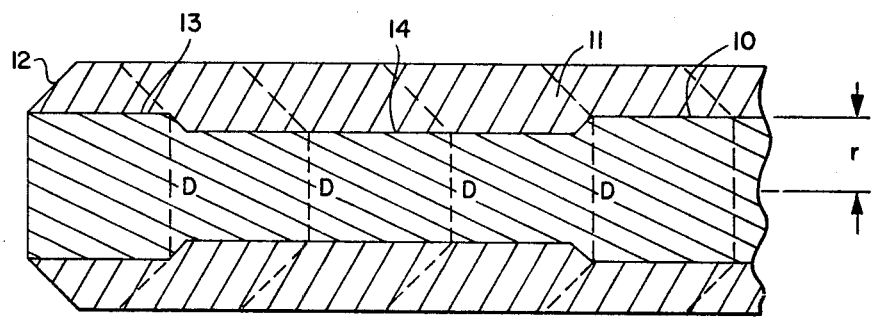
Figure 3:
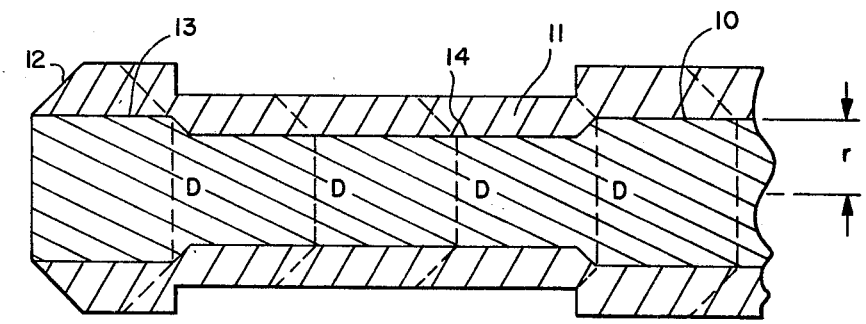

In the accompanying drawings I have shown certain present preferred embodiments of the invention in which FIG. 1 is a diagrammatic cross-sectional view of a prior art electrode as hereinafter explained; and FIGS. 2 and 3 are diagrammatic cross-sectional views of examples of my improved electrode as hereinafter explained.

The prior art of dealing with electrode starting porosity includes the electrode configuration shown in FIG. 1 which shows the use of a core wire 1 shaped to a conical point 2 at the starting end and coated to a uniform electrode diameter with coating 3. The point 4, which may be slightly blunted, is exposed for striking but the coating is not brushed back for ease of striking as this would lower the coating to core ratio to which the porosity improvement is attributed. The burn off configuration of the electrode at successive lengths of 1 core diameter is shown at positions D. While this configuration may be used to influence porosity somewhat it has serious disadvantages including the absence of a conventional brush back on the striking end which exasperates the weldor by making the arc difficult to strike without repeated attempts.

It has heretofore been proposed to secure a reduction in starting porosity by pointing or beveling to some degree the starting tip of electrode core wires. Any beneficial effects which such core alterations produce, such as increased current density, must have their maximum effect at the very start of the electrode, then fall away as the core section increases and disappear as the full section is reached. However, by the time weld metal starts to crystallize from a full weld pool the early benefits have been partly lost and the prevelent welding conditions are then standard. As far as starting porosity is concerned the quantity of coating present over the reduced end section whether in excess or not is not as important as the enhanced current density schedule which supplies extra heat toward development of the normal weld pool working temperature making it more resistant to porosity entrapment.

With reduced end electrodes as heretofore proposed the highest current density occurs at the electrode tip even before the weld pool has started to form. I have found that the benefits from enhanced current density can be more effectively used, not during the initiation of the weld pool, but during its completion. The present invention reserves extra heat until the weld pool has been well started and already contains some metal. Then as the pool is being brought to full size the extra heat is more efficiently applied to insure that it finishes at full working temperature and is porosity resistant at the time metal begins to crystallize from it.

The advantages of the present invention are achieved by the use of a core wire which has a full standard cross section at the starting tip and for some length along the body of the core wire. Following this length of standard diameter the cross section of the wire is reduced to provide an intermediate section where increased current density produces the extra heating effect required to bring the starting weld pool to maturity at full operating temperature where it is resistant to porosity. Since the tendency toward porosity varies with each electrode type and size and since it is the function of the modified core wire section to produce welding conditions which inhibit porosity the level of modification needed can vary considerably between electrodes and is easily determinable by trial. While it is often convenient to consider a given electrode in terms of units of core wire diameter for the purpose of generalization the intermediate section proportions which I employ can more readily be stated in inches. In general no more than about one inch of a standard electrode can be put into its starting weld pool and modifications to reduce starting porosity should occur within this length. For the electrode size range of $3/32$ to $1/4$ inch size this is about 4 to 11 core diameters or slightly more when allowing for a reduced core volume portion. Within this length will be included the tip portion of standard cross section whose length may vary from about .1 to about .4 inch.

A typical stainless-low hydrogen electrode melts at a rate of about 5.2 seconds per inch and the need for especially favorable conditions prevails at the start, remains acute for a small number of seconds and then disappears rapidly. These special conditions are favored by a reduced core wire section which produces an increase in current density and beneficial effects have been found with reduced sections which are consumed in time intervals ranging from about 6 seconds down to 1 or 2 seconds or as little as about .2 inch.

An example of the striking end of my improved electrode is shown in FIG. 2 where 10 is the electrode core wire and 11 the coating; the balance of the electrode including the grip end, being standard, is not shown. The electrode has a conventional external appearance and for ease of striking the coating is brushed back at the tip at an angle of about 45° as shown at 12.

As has been stated, to provide a rapid start toward the development of the initial weld pool the first portion of the core wire of this invention is of full section. As shown in FIG. 2 this section 13 is one core diameter in length and in general its length may vary between about .1 inch and about .4 inch. Over this portion of the electrode the welding operation proceeds normally with the usual current density applied to the full diameter core wire which melts to produce a partly filled weld pool on the core base metal. The burn off configuration of the electrode at successive lengths of one core diameter are shown at positions D.

The first portion of the core wire of full section is followed by a reduced diameter core wire section 14 and in the example of FIG. 2 for a length of three core wire diameters the wire diameter is reduced to about 70% of standard before being returned to full diameter for the balance of the electrode. Small fillets are shown at the changes in core wire section. In general the reduced section may vary from about .2 inch to 1 inch in length with about .3 inch to about .7 inch being preferred, while the area of the reduced section may be from about 35% to 85% of the unreduced portion. To control spatter losses the maturing weld pool should not be subjected to too forceful an arc and this range of area provides a current density from about 118% to 285% of standard.

The electrode example shown in FIG. 2 has a uniform outside coating diameter making the coating heavier over the reduced core section. In such a case a reasonable balance should be used between the length and diameter of the reduced section since a core wire section too long and thin and covered with a thick coating may tend to burn back and quench itself out before the core section returns to standard diameter. As the arc reaches the reduced core section the current density of the arc is sharply elevated and the weld pool is completed or largely so with the benefit of the increased heating effect which, being reserved until late, develops a hot and porosity resistant weld pool from which weld metal freezes slowly enough to allow the escape of the gas bubbles which cause porosity. Favorable steady state weld pool conditions having been established with speed and increased reliability through the agency of the intermediate reduced core wire section, as the full core section is reached the electrode conditions return to normal and so continue as the balance of the electrode is consumed.

When using an electrode as shown in FIG. 2 a skilled weldor can detect by arc action when the arc returns abruptly to the standard diameter core wire section and this may be used as a reference point as to the size and state of the weld pool and indicate when the arc may be safely moved ahead with minimum hazard of trapped starting porosity.

While the electrode example of FIG. 2 is effective in minimizing starting porosity the proportions shown supply a preponderance of coating in the starting portion. This over-supply of metallics from the coating produces variations in the starting composition which are undesirable in many critical analyses where additions are often made by way of the coating.

When the core wire of FIG. 2 has a radius r and the coating thickness of .73 r a calculation shows that after allowing for the coating loss due to brush back and cone formation the ratio of coating to core over the first four core diameters of electrode is about 3.37. Since the balance of the electrode has a ratio of 2.00, over the first four core diameters the contribution of metallics from the coating is 68% higher than desired. If less coating is applied over the reduced core wire section a balance can be secured whereby both resistance to porosity and deposit analysis control can be secured. Such an electrode is shown in FIG. 3 which is identical to FIG. 2 except that over the reduced core wire section for a distance of 2.85 core diameters the coating has been reduced to an outside diameter of 2.7 r. The same reference numerals as are used in FIG. 2 are also employed in FIG. 3. A calculation of the coating and core quantities for FIG. 3 shows that the ratio of the quantity of coating consumed during the melting of the full end core section plus the diminished core section to the quantity of core metal in these two sections is about 1.98 which is almost exactly the desired standard ratio in this case of 2.00. A ratio of at least between 90 and 120% of standard must be used for analytical control. The local removal of coating from over the reduced core section can be readily done by a grinding or brushing operation and in this region the electrode area may be reduced to as small as 35% of standard.

A core wire with an intermediate reduced section such as that of FIG. 2 or FIG. 3 can be made by grinding, pressing, rolling or other common convenient means for fabricating a reduced section. Such a core wire can be assembled from shorter pieces as by welding. Over the reduced diameter section cylindrical or conical shapes are most practical but others can be made to serve. In addition to its other advantages the core wire of the present invention with its standard end conformation can be readily handled in the conventional coating extrusion process without equipment changes.

Thus I provide a stainless-low hydrogen type coated arc welding electrode having the coating conventionally brushed back for ease of striking and having improved control of the starting portion of the weld deposit in respect to porosity, and when desired in respect to both porosity and analysis, comprising a core wire having a full standard cross section at the starting tip and for some length along the body of the core wire followed by an intermediate length of diminished cross section, the balance of the core wire being again standard, the coating over the electrode having a uniform outside diameter or when desired being reduced and proportioned over the reduced core section so that the coating and core consumed during melting of the full starting end plus diminished section of core wire have about the same ratio as is found over the unmodified standard portion of the electrode.

While I have shown and described certain present preferred embodiments of the invention it is to be distinctly understood that the invention is not limited thereto but may be otherwise variously embodied within the scope of the following claims.

I claim:

1. A coated arc welding electrode for minimizing porosity or for minimizing both porosity and variation in compositon of the weld metal at the start of welding comprising a core wire having a coating thereabout, the core wire having a body of uniform cross-sectional area and a starting end portion at one end of the body, the starting end portion of the core wire having at the end of the electrode a length of substantially the same cross-sectional area as the body of the core wire and including a length of diminished cross-sectional area following the first mentioned length, the cross-sectional area of the length of diminished cross-sectional area of the core wire being between about thirty-five and about eighty-five percent of the cross-sectional area of the body of the core wire, the total cross-sectional area of the electrode, including the coating, at the length of diminished cross-sectional area of the core wire being between about thirty-five and about one hundred percent of the total cross-sectional area of the electrode, including the coating, at the body of the core wire.

2. A coated arc welding electrode for minimizing porosity or for minimizing both porosity and variation in composition of the weld metal at the start of welding as claimed in claim 1 in which the coating is a stainless-low hydrogen type coating.

3. A coated arc welding electrode for minimizing porosity or for minimizing both porosity and variation in composition of the weld metal at the start of welding as claimed in claim 1 in which the components of the electrode are proportioned so that the ratio of the quantity of coating consumed to the quantity of core wire consumed during the melting of the starting end portion is between about ninety and about one hundred twenty percent of the ratio of the quantity of coating consumed to the quantity of core wire consumed during the melting of the body of the electrode.

4. A coated arc welding electrode for minimizing porosity or for minimizing both porosity and variation in composition of the weld metal at the start of welding as claimed in claim 3 in which the length of the starting end portion of the core wire which is of substantially the same cross-sectional area as the body of the core wire has a longitudinal extent equal to between about .1 inch and about .4 inch and the length of the starting end portion of the core wire which is of diminished cross-sectional area has a longitudinal extent equal to between about .2 inch and about 1 inch.

5. A coated arc welding electrode for minimizing porosity or for minimizing both porosity and variation in composition of the weld metal at the start of welding as claimed in claim 4 in which the length of the starting end portion of the core wire which is of diminished cross-sectional area has a longitudinal extent equal to between about .3 inch and about .7 inch.

6. A coated arc welding electrode for minimizing porosity or for minimizing both porosity and variation in composition of the weld metal at the start of welding as claimed in claim 5 in which the coating is a stainless-low hydrogen type coating.

7. A coated arc welding electrode for minimizing porosity or for minimizing both porosity and variation in composition of the weld metal at the start of welding as claimed in claim 1 in which the total cross-sectional area of the electrode, including the coating, at the length of diminished cross-sectional area of the core wire is substantially the same as the total cross-sectional area of the electrode, including the coating, at the body of the core wire.

8. A coated arc welding electrode for minimizing porosity or for minimizing both porosity and variation in composition of the weld metal at the start of welding as claimed in claim 7 in which the length of the starting end portion of the core wire which is of substantially the same cross-sectional area as the body of the core wire has a longitudinal extent equal to between about .1 inch and about .4 inch and the length of the starting end portion of the core wire which is of diminished cross-sectional area has a longitudinal extent equal to between about .2 inch and about 1 inch.

9. A coated arc welding electrode for minimizing porosity or for minimizing both porosity and variation in composition of the weld metal at the start of welding as claimed in claim 8 in which the length of the starting end portion of the core wire which is of diminished cross-sectional area has a longitudinal extent equal to between about .3 inch and about .7 inch.

10. A coated arc welding electrode for minimizing porosity or for minimizing both porosity and variation in composition of the weld metal at the start of welding as claimed in claim 2 in which the total cross-sectional area of the electrode, including the coating, at the length of diminished cross-sectional area of the core wire is substantially the same as the total cross-sectional area of the electrode, including the coating, at the body of the core wire.

References Cited

UNITED STATES PATENTS

| | | | |
|---|---|---|---|
| 3,231,332 | 1/1966 | Jones et al. | 219—146 |
| 3,370,152 | 2/1968 | Rolnick | 219—146 |

JOSEPT V. TRUHE, Primary Examiner

L. A. ROUSE, Assistant Examiner

PO-1050
(5/69)

UNITED STATES PATENT OFFICE
CERTIFICATE OF CORRECTION

Patent No. 3,511,969          Dated May 12, 1970

Inventor(s) DAVID F. HELM

It is certified that error appears in the above-identified patent and that said Letters Patent are hereby corrected as shown below:

Column 1, line 71, "stretngth" should be --strength--.
Column 2, line 24, "proosity" should be --porosity--; line 38, "units" should be --unit--; line 64, "inducting" should be --inducing--. Column 5, line 8, "core" should be --cold--; same line, "configuration" should be --configurations--.
Column 8, line 35, "JOSEPT" should be --JOSEPH--.

SIGNED AND
SEALED
SEP 2 - 1970

(SEAL)
Attest:

Edward M. Fletcher, Jr.
Attesting Officer

WILLIAM E. SCHUYLER, JR.
Commissioner of Patents